(No Model.)
J. D. ANDERSON.
PIPE COUPLING.
No. 526,097. Patented Sept. 18, 1894.
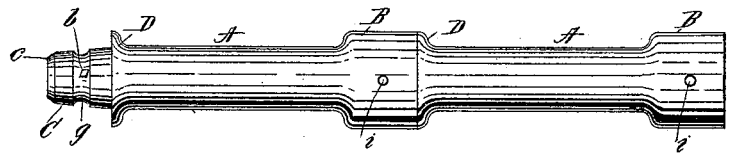
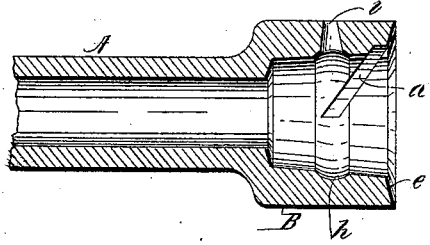 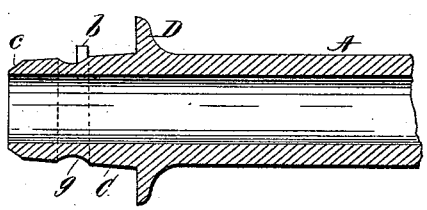
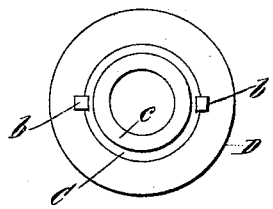
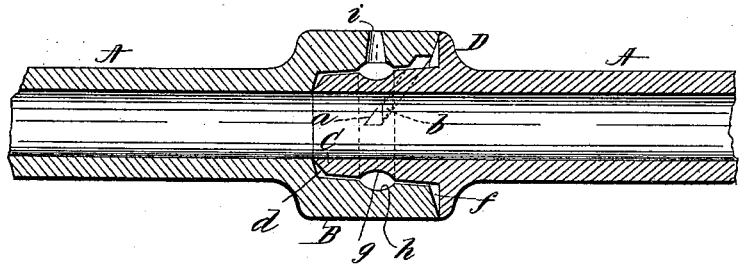
Witnesses:
John Buckler,
L. H. Osgood
Inventor:
John D. Anderson,
By Worth Osgood
Attorney

UNITED STATES PATENT OFFICE.

JOHN D. ANDERSON, OF BROOKLYN, NEW YORK.

PIPE-COUPLING.

SPECIFICATION forming part of Letters Patent No. 526,097, dated September 18, 1894.

Application filed July 11, 1894. Serial No. 517,208. (No model.)

*To all whom it may concern:*

Be it known that I, JOHN D. ANDERSON, a citizen of the United States, and a resident of Brooklyn, in the county of Kings and State of New York, have invented certain new and useful Improvements in Pipe-Couplings, of which the following is a specification.

My invention relates to means for coupling pipes of any character or for any use wherein the form of coupling may be adopted, whether the pipes are intended to convey water, air or gas, or to be used after the manner of piles or in building or engineering construction.

The object of my invention is to provide a simple, cheap and effective form of coupling which may be easily made and used, and which will admit of being packed in a perfect and secure manner against leakage of material. To accomplish all of this my improvements involve certain new and useful features of invention as will be herein fully described and claimed.

In the drawings, Figure 1, is an elevation showing two similar sections of pipe united in accordance with my invention. Figs. 2 and 3 are sectional views showing only the ends of two pipe sections, the two ends fashioned in accordance with my invention and illustrating my improved form of coupling. Fig. 4 is an end elevation corresponding with Fig. 3, showing the lugs on opposite sides of the entering portion of the coupling. Fig. 5 is a sectional view showing the parts of the coupling united, but omitting the cement or packing.

In all the figures like letters of reference, wherever they occur, indicate corresponding parts.

A A are the main portions of sections of pipe which may be of any material, such as iron, glass, clay, or any other suitable substance, which portions are generally made cylindrical and of any size and length desired. The pipe sections are usually similar in size and shape, each having at one end an enlargement or hub, B, of which the interior is larger than the bore of the pipe, and at the other end a neck C, through which the bore of the pipe extends, the exterior of the neck being fashioned to correspond very nearly in size and shape with the interior of hub B. When the sections thus fashioned are coupled together, the bore of the pipe remains the same throughout and is not obstructed, as commonly occurs in the ordinary manner of coupling and packing sewer and such like pipes as they have heretofore most commonly been made. The neck C is considerably elongated, as appears from the drawings, so that when finally located in place, one section is practically immovable with respect to the other, except in the direction of its axis, whereby disturbance of the joint by mere settling is obviated.

In my patent of February 13, 1894, (No. 514,432,) the neck portion of the coupling was made cylindrical to fit the correspondingly shaped interior of the hub, a single thread or winding was employed to draw the parts together, and provision made for the introduction of packing only at the inner and outer ends of the joint. Under that construction manifestly the packing can only be forcibly compressed at the ends, and if the parts be turned to their fullest extent only the metallic bearings at the extremities of the joint can be effected or tightened, the part between the ends being equally as well closed under one condition as another. It frequently occurs that an extra tight joint is required, either to prevent leakage or to prevent otherwise possible movement of the parts—and to provide for this I make the entering portion or neck C tapering from end to end as shown, and form the cavity in hub B to correspond, and otherwise construct the joint in a peculiar manner, as will appear from the following.

Within the hub B are spiral channels $a$ $a$ extending from the front, where it is open, about a quarter way around the inner surface, on opposite sides,—and on the neck are formed corresponding lugs $b$ $b$ of sufficient length only to contribute the necessary strength, and intended to enter the channels $a$. To unite these two parts, the neck is inserted in the hub so that lugs $b$ will enter channels $a$. Then by turning one section in the proper direction, one is drawn toward the other to its proper seating, the two parts being capable of being thus drawn into close contact throughout a considerable length of bearing, as will be observed. To disturb this coupling when the pipe is placed, it is plain that one section must back away from the other, which is practically impossible unless it be purposely turned. The lugs and spiral channels together not only operate to draw the parts toward each other as above explained, but form a lock by which their separation or backing away from each other is prevented after being once located for use. That the joint may be made secure against leakage, the extremity of neck C is chamfered or cut away as at $c$ so that when in place within the hub it forms, with the inner portion thereof, a packing receiving cavity $d$, and this obviates the necessity of forming a special cavity in the hub, as in my former patent, being easier and cheaper to accomplish. The face of the hub is incut or inclined as represented at $e$, and around the neck C and backing the same, is a boss or enlargement D, which when brought up against the end of the hub, forms with it a packing receiving cavity $f$.

Into the cavities $d$ and $f$ a small quantity of cement or other suitable packing is introduced before the coupling parts are brought together, and then, when they are finally seated, this cement or packing is squeezed so as to completely fill the spaces intended to be closed, and is not then subjected to exposure either within or without the pipe. To further pack the joint, I supply the neck with a groove $g$, and the interior of the hub with a corresponding groove $h$, the latter opening to the exterior through a narrow passageway $i$. When the parts are coupled, but preferably before they are finally seated, cement or suitable packing material is introduced at the opening $i$ and finds its way all around through the channels $g$ and $h$. The tightening of the joint squeezes the packing so that it will fill all the space which it can possibly enter between the neck and hub, and thus secure the joint throughout its length the inclined surfaces of the joint being forcibly wedged by the act of turning one part in the other. In this way any inaccurate fitting of the hub and neck is compensated for. By making the lugs short, the packing material entering the channels behind them, operates to prevent them moving backward, and therefore to prevent the pipes from being turned.

The coupling is simple and easy to make, the parts may be easily united and perfectly packed, and the joint is secure against leakage.

Having now fully described my invention, I claim as new—

1. In a pipe coupling, the combination of the hub having its inner surface inclined and having the spiral channels, and the neck backed by a boss or enlargement inclined to fit the hub, and carrying the lugs, the neck and hub being grooved to form a packing cavity between the ends of the coupling the inclined parts being arranged to be wedged by turning one part in the other, substantially as and for the purposes set forth.

2. The herein described pipe coupling consisting of a hub having its inner surface inclined, its extremity beveled and having spiral channels and a central groove with an opening to the exterior, and the neck backed by a boss and having the beveled extremity, lugs on opposite sides and a central groove, the parts being arranged to confine and compress the packing and to be wedged by turning one part in the other, substantially as and for the purposes set forth.

Signed at New York, in the county and State of New York, this 9th day of July, A. D. 1894.

JOHN D. ANDERSON.

Witnesses:
W. J. MORGAN,
WORTH OSGOOD.